US008124256B2

(12) United States Patent
Kuse et al.

(10) Patent No.: US 8,124,256 B2
(45) Date of Patent: Feb. 28, 2012

(54) MAGNETIC RECORDING MEDIUM

(75) Inventors: Sadamu Kuse, Ibaraki (JP); Kazuhiko Nakiri, Ibaraki (JP)

(73) Assignee: Hitachi Maxell, Ltd., Ibaraki-Shi, Osaka (JP)

( * ) Notice: Subject to any disclaimer, the term of this patent is extended or adjusted under 35 U.S.C. 154(b) by 639 days.

(21) Appl. No.: 11/201,157

(22) Filed: Aug. 11, 2005

(65) Prior Publication Data

US 2006/0035114 A1 Feb. 16, 2006

(30) Foreign Application Priority Data

Aug. 12, 2004 (JP) ................. P2004-235260

(51) Int. Cl.
G11B 5/706 (2006.01)

(52) U.S. Cl. ............... 428/844.7; 428/844; 428/844.5; 428/844.6

(58) Field of Classification Search ............ 428/844, 428/838, 840.1, 840.2, 845
See application file for complete search history.

(56) References Cited

U.S. PATENT DOCUMENTS

| | | | |
|---|---|---|---|
| 5,567,502 A | 10/1996 | Miyabara et al. | |
| 5,795,642 A * | 8/1998 | Ishikawa et al. | 428/141 |
| 6,517,934 B1 | 2/2003 | Kishimoto | |
| 6,521,361 B2 * | 2/2003 | Ejiri et al. | 428/838 |
| 6,623,789 B2 | 9/2003 | Shimada et al. | |
| 6,641,891 B2 * | 11/2003 | Doushita et al. | 428/838 |
| 6,939,606 B2 * | 9/2005 | Hashimoto et al. | 428/840.2 |
| 7,045,227 B2 * | 5/2006 | Ishikawa et al. | 428/840.1 |
| 7,056,607 B2 * | 6/2006 | Zinbo et al. | 428/840.2 |
| 7,186,472 B2 * | 3/2007 | Zinbo | 428/844.3 |
| 7,259,935 B2 * | 8/2007 | Inoue et al. | 360/132 |
| 7,494,728 B2 | 2/2009 | Kuse et al. | |
| 2004/0110037 A1 | 6/2004 | Kuse et al. | |
| 2006/0003191 A1 | 1/2006 | Kuse et al. | |

FOREIGN PATENT DOCUMENTS

| | | | |
|---|---|---|---|
| EP | 1 073 041 A1 | | 1/2001 |
| JP | 5-197946 A | | 8/1993 |
| JP | 7-272256 A | | 10/1995 |
| JP | 8-263829 A | | 10/1996 |
| JP | 2001-101647 A | | 4/2001 |
| JP | 2001-181754 A | | 7/2001 |
| JP | 2003-6835 A | | 1/2003 |
| JP | 2003-077118 A | | 3/2003 |
| JP | 2003077118 A | * | 3/2003 |
| JP | 2003-272123 A | | 9/2003 |
| JP | 2004-5896 A | | 1/2004 |
| JP | 2004-30828 A | | 1/2004 |
| JP | 2004-79004 A | | 3/2004 |

OTHER PUBLICATIONS

Japanese Office Action issued Mar. 31, 2009 in corresponding Japanese Application No. 2004-235260.

* cited by examiner

*Primary Examiner* — Mark Ruthkosky
*Assistant Examiner* — Gary Harris
(74) *Attorney, Agent, or Firm* — Birch, Stewart, Kolasch & Birch, LLP

(57) ABSTRACT

A magnetic recording medium with excellent high density recording performances and good durability comprising a non-magnetic substrate, a non-magnetic layer containing a non-magnetic powder and a binder formed on the non-magnetic substrate, and a magnetic layer having a thickness of less than 100 nm and containing a substantially particulate non-magnetic powder, a substantially particulate magnetic powder having an average particle size of less than 25 nm, and a binder, wherein an average particle size R of the non-magnetic powder contained in the magnetic layer and a thickness D of the magnetic powder satisfy the following relationship: $0.88 \leq R/D \leq 2.5$.

6 Claims, 2 Drawing Sheets

MAGNETIC RECORDING MEDIUM

FIELD OF THE INVENTION

The present invention relates to a coating type magnetic recording medium having excellent high density recording performances and good durability.

BACKGROUND OF THE INVENTION

Magnetic recording media have found a variety of applications such as audio tapes, video tapes, computer tapes, magnetic discs, magnetic cards, etc. Particularly in the field of data backup tapes, magnetic tapes having a memory capacity of several hundred GB or more per reel have been commercialized in association with the tendency of the mass storages of hard discs for backup, and a mass storage backup tape having a memory capacity of exceeding 1 TB has been proposed. Under these circumstances, magnetic recording media having far higher density recording performance will be indispensable in future.

In the manufacturing of magnetic tapes capable of corresponding to such high density recording, highly advanced techniques are employed to manufacture fine magnetic powder (hereinafter also referred to as magnetic particles), to fill coating layers with such magnetic powder at higher densities, to smoothen coating layers and to form thinner magnetic layers.

Regarding the improvement of the magnetic powder, trials to reduce the sizes of magnetic particles and simultaneously improve the magnetic characteristics thereof have been made in order to record signals with shorter wavelengths. For this improvement, needle-shaped metallic magnetic particles having an average particle size of 25 to 65 nm (JP-A-2004-79004), plate-shaped hexagonal ferrite magnetic particles having an average particle size of 50 nm or less (JP-A-2004-30828), and spherical or ellipsoidal rare earth element-iron-boron magnetic particles having an average particle size of 50 nm or less (JP-A-2001-181754) are proposed. To prevent a decrease in output from a magnetic tape due to demagnetization in association with the recording of signals with short wavelengths, trials to manufacture magnetic recording media having higher coercive forces have been more vigorously made in these years.

On the other hand, the improvement of the manufacturing technology for magnetic recording media confronts some difficulties. In association with the high density recording of data on magnetic media, the wavelengths of signals of data to be recorded become shorter and shorter. When the magnetic layer of a magnetic medium is thick, the influences of loss due to self demagnetization during the recording/reproducing of data and loss due to the thickness of the magnetic layer increase and then the decrease of output become more serious, although such problems hitherto have not been so seriously taken. Therefore, the reduction of the thickness of the magnetic layers of magnetic media is needed.

However, when the thickness of a magnetic layer is reduced, there arise some problems such that a leakage magnetic flux from a magnetic layer is weakened, and that the surface roughness of a non-magnetic substrate is greatly reflected on the surface of the magnetic layer and degrades the surface smoothness of the magnetic layer. When the thickness of a magnetic layer is reduced, a method of decreasing the solid content in a magnetic coating composition or a method of decreasing the amount of the magnetic coating composition to be applied is considered. However, these methods are not effective to eliminate the defects in a coating step or to increase the amount of magnetic particles filled in the magnetic layer, which leads to the lower strength of the coating layer.

For the above reason, to reduce the thickness of a magnetic layer by improving the manufacturing technology for media, a so-called concurrent layer-superposing system is proposed. In this system, a non-magnetic layer (hereinafter referred to as a non-magnetic primer layer, a primer layer or a lower layer) is provided between a non-magnetic substrate and a magnetic layer, and an upper magnetic layer is applied while the non-magnetic primer layer is still being wet (cf. JP-A-2004-79004).

To cope with the weakening of the leakage flux from the magnetic layer, highly sensitive magnetoresistance (MR) heads are dominantly used as reproducing heads in the systems using such magnetic recording media. The MR heads have no induction coil and therefore cause less mechanical noises, which leads to a higher C/N ratio, since noises from the magnetic recording media can be lessened.

However, the MR heads have a disadvantage such that noise, i.e. thermal noise, tends to be generated by the collision of the minute unevenness of the surfaces of magnetic layers to the MR device, while such minute unevenness have caused few problems in the magnetic induction type heads. Therefore, more careful attentions are needed to control the surface roughness of the magnetic layers.

As described in the above, since a magnetic layer is designed to be very thin, the shapes of the surface roughness thereof is greatly influenced by the particle size of a non-magnetic powder contained in the magnetic layer. The relationship of the thickness of the magnetic layer with the particle size of the non-magnetic powder contained in the magnetic layer and/or a primer layer have been repeatedly studied (cf. JP-A-5-197946, JP-A-7-272256, JP-A-2004-5896 and JP-A-8-263829).

In order to provide a magnetic recording medium having excellent high density recording performances and also good durability, it is necessary (1) to use a fine particle magnetic powder, (2) to decrease the thickness of a magnetic layer and (3) to suitably control the surface condition of the magnetic layer.

JP-A-2004-79004, JP-A-2004-30828, JP-A-2001-181754 and JP-A-2004-5896 disclose magnetic recording media comprising a fine particle magnetic powder. However, they do not satisfactorily meet the above requirements (1), (2) and (3), and cannot sufficiently achieve the high recording density and durability at the same time.

JP-A-5-197946 and JP-A-7-272256 disclose the improvement of the durability of magnetic recording media by controlling the average particle size of a non-magnetic powder contained in a magnetic layer. However, they cannot achieve sufficient high recording density performances, since the particle size of a magnetic powder is too large or the thickness of the magnetic layer is too large.

JP-A-8-263829 discloses a magnetic recording medium comprising a magnetic layer and a layer containing an abrasive, which is provided adjacent to the magnetic layer, in which a ratio of the average particle size of the abrasive to the dry thickness of the magnetic layer is 1.0:1 to 5.0:1. However, it cannot achieve sufficiently high recording density performances, since the particle size of a magnetic powder is too large or the shape anisotropy of the magnetic powder is too large.

Accordingly, the magnetic recording media of the above patent applications cannot have a high capacity and good durability.

SUMMARY OF THE INVENTION

An object of the present invention is to provide a magnetic recording medium, e.g., a magnetic tape, having high density recording performance which permits mass storage of 1 TB or more per reel, and also having highly reliable durability.

To achieve the above object, the present invention provides a magnetic recording medium comprising a non-magnetic substrate, a non-magnetic layer containing a non-magnetic powder and a binder formed on the non-magnetic substrate, and a magnetic layer having a thickness of less than 100 nm and containing a substantially particulate non-magnetic powder, a substantially particulate magnetic powder having an average particle size of less than 25 nm, and a binder wherein an average particle size R of the non-magnetic powder contained in the magnetic layer and a thickness D of the magnetic layer satisfy the following relationship:

$$0.88 \leq R/D \leq 2.5.$$

In particular, according to the present invention, the substantially particulate non-magnetic powder contained in the magnetic layer has an average particle size of less than 200 nm.

Since the magnetic recording medium of the present invention has the above structures and characteristics, it has excellent high density recording performances, good recording/reproducing characteristics, and also good durability, and is preferably used with a recording/reproducing equipment using a MR head.

DETAILED DESCRIPTION OF THE INVENTION

Figure 1:
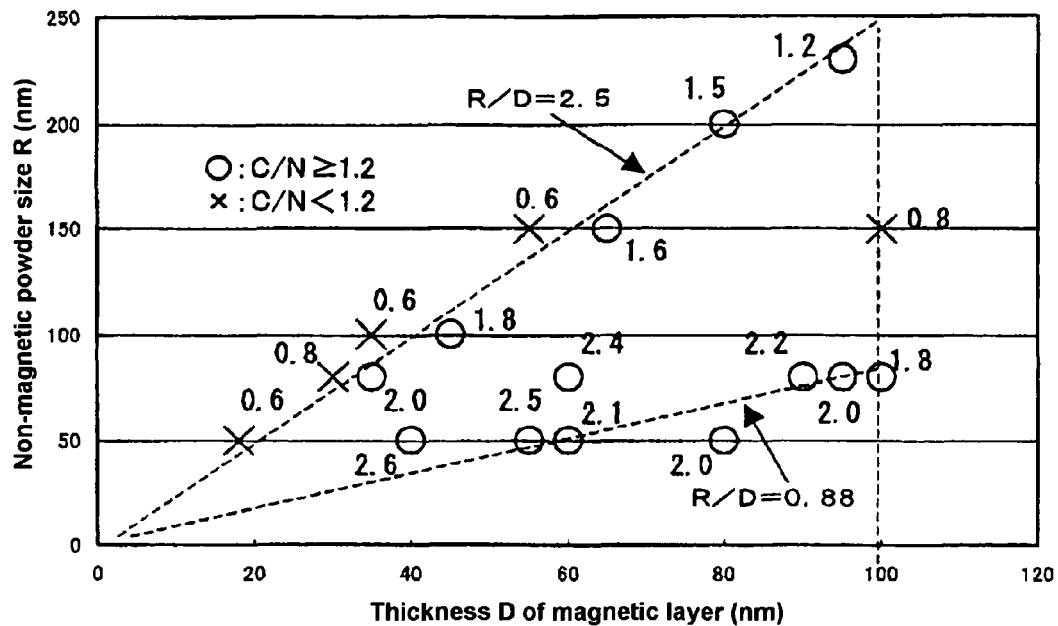
FIG. 1 shows the relationship between R and D values and C/N value of the computer tapes produced in Examples and Comparative Examples.

With a recording/reproducing equipment using a MR head as a reproducing head, it is important to reduce the noise of a magnetic recording medium. To achieve the reduction of such noise, it is necessary to increase the number of non-magnetic powder particles contained in a unit volume of the magnetic layer as much as possible. To this end, preferably, the particle size (particle volume) of the magnetic powder is made smaller and the filling rate thereof is increased.

The particles of the magnetic powder usually have a needle shape or a plate-shape. In these years, magnetic powders having a spherical particle shape have been proposed (cf. JP-A2001-181754 and JP-A-2004-5896). When the magnetic layer of a magnetic recording medium is formed, the magnetic powder particles are usually oriented to increase a reproducing output.

When the magnetic powder having an shape anisotropy such as a needle-shape or plate-shape one is used, the particles are arranged in an orientation direction in an orientation step, but they may not be completely oriented. The needle-shaped or plate-shaped magnetic powder particles disturb the orientation to deteriorate the filling property of the magnetic powder, and thus they may interfere with the decrease of a noise.

In contrast, in the case of the spherical magnetic powder particles, the filled structure of the particles is not disturbed by the orientation, so that the magnetic layer can have a high filling rate of the magnetic powder. Among the needle-shaped or plate-shaped magnetic powder, those having an acicular ratio (a ratio of a longer axis length to a shorter axis length) or a plate ratio (a ratio of a diameter to a thickness of a plate) close to 1 can have the same effects as the particulate (spherical) magnetic powder. Preferably, the acicular ratio or plate ratio is preferably less than 2, more preferably 1.5 or less, most preferably less than 1.5.

In the present invention, the above-described shape anisotropic magnetic powder and the particulate magnetic powder having an axis ratio of less than 2, preferably 1.5 or less are collectively called as a substantially particulate magnetic powder.

Preferably, the thickness of the magnetic layer is decreased, since the self demagnetization and the resolution of a reproducing waveform are improved in the case of short wavelength recording.

Accordingly, in the present invention, a magnetic recording medium preferably comprises a non-magnetic substrate, a non-magnetic layer containing a non-magnetic powder and a binder formed on the non-magnetic substrate, and a magnetic layer having a thickness of less than 100 nm and containing a substantially particulate non-magnetic powder, a substantially particulate magnetic powder having an average particle size of less than 25 nm, and a binder.

With such a magnetic recording medium, preferable properties of the substantially particulate non-magnetic power to be contained in the magnetic layer have been investigated. As a result, it has been found that, when the following property is met, the magnetic recording medium can have good recording/reproducing performances and durability, in particular, low thermal noise.

That is, the average particle size R of a substantially particulate non-magnetic powder having the largest average particle size among non-magnetic powders contained in the magnetic powder and the thickness D of the magnetic layer preferably satisfy the following relationship:

$$0.88 \leq R/D \leq 2.5 \tag{1}$$

When the R/D ratio is less than 0.88, the particle size of the non-magnetic powder is too small in relation to the thickness of the magnetic layer so that the effect to reinforce the magnetic layer is low and the durability of the magnetic recording medium cannot be sufficiently improved. When R/D ratio exceeds 2.5, the particle size of the non-magnetic powder is too large in relation to the thickness of the magnetic layer so that the protruded degree of the non-magnetic powder from the surface of the magnetic layer becomes large or the distribution of the magnetic powder in the magnetic layer is disturbed. Therefore, the spacing between the magnetic head and the magnetic layer increases and thus the output decreases, or the protrusions of the magnetic layer collide with the MR device and thus the thermal noise increases.

When an MR head is used as a reproducing head, the average particle size R of the substantially particulate non-magnetic power and the thickness D of the magnetic layer satisfy the above relationship (1), and also the average particle size R is preferably less than 200 nm, more preferably 180 nm or less, since the thermal noise is further decreased.

Apart from the substantially particulate non-magnetic power the average particle size R of which satisfies the above relationship (1), the magnetic layer may contain a non-magnetic powder the average particle size of which does not satisfy the above relationship (1).

The non-magnetic powder to be contained in the magnetic layer may have an ellipsoidal shape, a needle shape, a plate shape or any other shape, although it preferably has a spherical shape. When the non-magnetic powder has a shape other than the spherical shape, its particle size is its maximum span. That is, in the case of a needle shape, its particle size is equal to its major axis length, and in the case of a plate shape, its particle size is its diameter. When the non-magnetic powder has a shape anisotropy like the ellipsoidal, needle-shaped, plate-shaped or other shaped powder, it is preferably a substantially particulate powder having an axis ratio (a ratio of a larger size to a smaller size), an acicular ratio (a ratio of a major axis to a minor axis), or a plate ratio (a ratio of a diameter to a thickness of a plate) of preferably less than 3, more preferably less than 2.

The other shape may be any polyhedron.

To compound the substantially particulate non-magnetic powder which satisfies the above relationship (1) in the magnetic layer of the magnetic recording medium of the present invention, in general, the non-magnetic powder is beforehand added to a magnetic paint for forming the magnetic layer. In some cases, the substantially particulate non-magnetic powder is added to a primer, and the particles of the non-magnetic powder protrude into the magnetic layer so that they are partly contained in the magnetic layer.

The relationship of the thickness of the magnetic layer and the particle size of the non-magnetic powder contained in the magnetic powder is discussed in some of the Japanese patent applications cited above.

For example, JP-A-5-197946 describes the use of a non-magnetic powder having a particle size larger than the thickness of a magnetic layer. The magnetic powder used in Examples having a particle size of 0.2 μm and an acicular ratio of 10, while the thickness of the magnetic layer is 0.2 μm (200 nm) or more. Since the particle size of the non-magnetic powder is 0.2 μm (200 nm) or more, the thermal noise increases when a MR head is used, and thus it is difficult to obtain a good C/N.

JP-A-7-272256 discloses a magnetic recording medium in which the ratio of an average particle size of abrasive particles to a thickness of a magnetic layer is from 1.0 to 1.8. However, this application uses an acicular magnetic powder having an average longer axis length of 0.05 to 0.6 μm, and the thickness of the magnetic layer is 0.2 μm or more. Since the magnetic powder particles have the acicular shape, they have insufficient filling properties in the magnetic layer. Since the particle size of the non-magnetic powder is 0.2 μm or more, the thermal noise increases when a MR head is used, and thus it is difficult to obtain a good C/N.

JP-A-2004-5896 discloses a magnetic recording medium comprising a magnetic layer having a thickness of 90 nm or less and containing a plate-form, granular or ellipsoidal magnetic powder having an axis ratio of 2 or less and a particle size of 5 to 50 nm. However, this patent application does not describe any relationship between the particle size of a non-magnetic powder contained in the magnetic layer and the thickness of the magnetic layer. In addition, the magnetic recording media produced in the Examples are outside the scope of the present invention.

JP-A-8-263829 discloses a magnetic recording medium comprising a magnetic layer having a dry thickness of 0.5 μm, in which an abrasive is contained in a layer adjacent to the magnetic layer, and a ratio of an average particle size of the abrasive to the dry thickness is from 1.0 to 5.0. However, a magnetic powder used is a ferromagnetic metal powder or a hexagonal ferrite. In particular, the ferromagnetic metal powder is preferably needle shaped, and has an longer axis length of 0.04 μm to less than 0.30 μm and an axis ratio (a ratio of an average longer axis length to an average shorter axis length) of 2 to 20. With these properties, it is difficult to obtain any good C/N.

Hereinafter, a non-magnetic substrate, a primer (non-magnetic) layer and a magnetic layer of a magnetic recording medium according to the present invention will be explained. A back coat layer may optionally be provided onto a surface of the non-magnetic substrate opposite to the surface on which the primer layer and the magnetic layer are formed. Thus, the back coat layer will also be explained. Furthermore, organic solvents used in the preparation of paints for forming the primer layer, the magnetic layer and the back coat layer will be explained.

Non-Magnetic Substrate

The thickness of the non-magnetic substrate may vary depending on applications of the magnetic recording media, and it is generally 1.5 to 11.0 μm, preferably 2.0 to 7.0 μm, more preferably 2.0 to 6.0 μm. When the thickness of the non-magnetic substrate is less than 1.5 μm, the formation of such a thin film is difficult, and the tape strength decreases. When the thickness exceeds 11.0 μm, the total thickness of the tape becomes large, which leads to less memory capacity per one reel of the tape.

The Young's modulus of the non-magnetic substrate in the machine direction is preferably 5.8 GPa (590 kg/mm$^2$) or more, more preferably 7.1 GPa (720 kg/mm$^2$) or more, most preferably 7.8 GPa (800 kg/mm$^2$) or more. When this Young's modulus is less than 5.8 GPa (590 kg/mm$^2$), the running of the tape becomes unstable.

In the helical scanning type, the ratio of the Young's modulus (MD) of the non-magnetic substrate in the machine direction to the Young's modulus (TD) of the substrate in the transverse direction is preferably 0.60 to 0.80, more preferably 0.65 to 0.75. When this ratio is less than 0.60, or when it exceeds 0.80, the flatness of output from the magnetic head between the entrance to the tracks and the exit therefrom sometimes becomes larger. This flatness becomes minimum when this ratio is around 0.70. In the linear recording type, the ratio of the Young's modulus of the substrate in the machine direction to the Young's modulus of the substrate in the transverse direction is preferably 0.70 to 1.30.

The thermal expansion coefficient of the non-magnetic substrate in the transverse direction is preferably from $-10 \times 10^{-6}$ to $10 \times 10^{-6}$, and the humidity expansion coefficient thereof in the transverse direction is preferably from 0 to $10 \times 10^{-6}$. When the thermal expansion coefficient or the humidity expansion coefficient in the transverse direction is outside the above range, off-track occurs due to a change in temperature or humidity, which leads to a higher error rate.

Specific examples of the non-magnetic substrate which satisfy all the above properties include biaxially oriented polyethylene terephthalate films, polyehtylene naphthalate films, aromatic polyamide films, aromatic polyimide films and the like.

Primer Layer

In the present invention, the magnetic layer has a thickness of less than 100 nm. Therefore, a primer layer is provided as a non-magnetic layer to improve the short wavelength recording characteristics.

The thickness of the primer layer is preferably 0.2 to less than 1.0 μm, more preferably 0.8 μm or less. When this thickness is less than 0.2 μm, the effect of decreasing the fluctuation of the thickness of the magnetic layer and the effect of improving the durability thereof are poor. When this thickness is 1.0 µm or more, the total thickness of the tape becomes too large, which leads to a less memory capacity per one reel of the tape.

Examples of the non-magnetic particles to be used in the primer layer include titanium oxide, iron oxide, aluminum oxide and the like. Preferably used is iron oxide alone or a mixture of iron oxide and aluminum oxide. The non-magnetic particles may be any of spherical particles, plate-shaped particles, needle-shaped particles and spindle-shaped particles. Preferably, the needle-shaped particles or the spindle-shaped particles have major axes of 50 to 200 nm, and minor axes of 5 to 100 nm.

In many cases, the primer layer contains the non-magnetic particles as a main component, and supplementarily carbon black particles with a particle size of 0.01 to 0.1 µm and/or aluminum oxide particles with a particle size of 0.05 to 0.2 µm, if necessary. To apply the primer layer smoothly without any variation in thickness, the use of the non-magnetic particles and the carbon black particles as mentioned above, both of which have sharp particle size distributions, is particularly preferred.

Preferably, non-magnetic plate-shaped particles with an average particle size of 10 to 100 nm are added to the primer layer. As the components of the non-magnetic plate-shaped particles, oxides or compound oxides of rare earth elements such as cerium, and zirconium, silicon, titanium, manganese, iron and the like are used.

To improve the electric conductivity of the primer layer, plate-shaped carbon particles such as graphite with an average particle size of 10 to 100 nm, or plate-shaped ITO (indium-tin compound oxide) particles with an average particle size of 10 to 100 nm may be added. The addition of the above non-magnetic plate-shaped particles is effective to improve the uniformity of the thickness, surface smoothness, rigidity and dimensional stability of the layer. The binder resin to be used in the primer layer may be the same one as that used in the magnetic layer, which will be explained below.

If the substantially particulate non-magnetic powder satisfying the relationship (1) is not added to the magnetic paint, it can be added to the primer layer paint. In such a case, when a thin magnetic layer having a thickness of less than 100 nm is applied on a primer layer by the wet-on-wet method, a part of the non-magnetic powder particles in the primer layer intrude into the magnetic layer and act as if the non-magnetic powder particles were contained in the magnetic layer. In this case, the substantially particulate non-magnetic powder contained in the primer layer preferably has an average particle size of less than 200 nm, and an axis ratio of less than 3.

Magnetic Layer

Preferably, the thickness of the magnetic layer is 10 to less than 100 nm. When this thickness is less than 10 nm, the resultant output from the tape is small, and it is difficult to form the magnetic layer with a uniform thickness. When this thickness is 100 nm or more, the self demagnetization and the total thickness of the tape become too large, which lead to the deterioration of the short wavelength recording characteristics.

The coercive force of the magnetic layer is preferably 160 to 400 kA/m, more preferably 200 to 350 kA/m, most preferably 220 to 320 kA/m. When the coercive force is less than 160 kA/m, an output from the tape decreases due to demagnetization in a demagnet field, when signals with shorter wavelengths are recorded. When it exceeds 400 kA/m, the recording of signals with a magnetic head becomes difficult.

As the binder resin to be used in the magnetic layer, there is used a polyurethane resin in combination with at least one resin selected from the group consisting of vinyl chloride resins, vinyl chloride-vinyl acetate copolymer resins, vinyl chloride-vinyl alcohol copolymer resins, vinyl chloride-vinyl acetate-vinyl alcohol copolymer resins, vinyl chloride-vinyl acetate-maleic anhydride copolymer resins, vinyl chloride-hydroxyl-containing alkyl acrylate copolymer resins and cellulose resins such as nitrocellulose. Above all, the combination of a polyurethane resin with a vinyl chloride-hydroxyl-containing alkyl acrylate copolymer resin is preferred. Examples of the polyurethane resin include polyester-polyurethane resins, polyether-polyurethane resins, polyether-polyester-polyurethane resins, polycarbonate-polyurethane resins and polyester-polycarbonate-polyurethane resins.

As the binder resin, there is preferably used a polymer such as an urethane resin, which has a functional group such as —COOH, —SO$_3$M, —OSO$_3$M, —P=O(OM)$_3$, —O—P=O(OM)$_2$ [in which M is a hydrogen atom, an alkali metal base or an amine salt], —OH, —NR$^1$R$^2$, —N$^+$R$^3$R$^4$R$^5$ [in which each of R$^1$, R$^2$, R$^3$, R$^4$ and R$^5$ is independently a hydrogen atom or hydrocarbon group], or an epoxy group. The use of such a binder resin is effective to improve the dispersibility of the magnetic particles and the like. When two or more of the binder resins are used in combination, it is preferable to use the resins which have functional groups of the same polarity, particularly —SO$_3$M groups.

In the magnetic layer, the binder resin is used in an amount of 7 to 50 parts by weight, preferably 10 to 35 parts by weight, per 100 parts by weight of the magnetic particles. Most preferably, 5 to 30 parts by weight of a vinyl chloride resin and 2 to 20 parts by weight of a polyurethane resin are used in combination as the binder resins.

Preferably, the binder resin is used in combination with a thermosetting crosslinking agent which is bonded to the functional group of the binder resin to crosslink the binder resin. Preferred examples of the crosslinking agent include a variety of polyisocyanates such as tolylenediisocyanate, hexamethylenediisocyanate, isophoronediisocyanate, reaction products of these isocyanates with compounds having a plurality of hydroxyl groups such as trimethtlolpropane and the like, condensates of these isocyanates, and the like. The crosslinking agent is used in an amount of generally 1 to 30 parts by weight, preferably 5 to 20 parts by weight per 100 parts by weight of the binder resin. When the magnetic layer is formed on the primer layer by the wet-on-wet method, some of the polyisocyanate of the primer layer is spread and supplied to the magnetic layer. Therefore, the magnetic layer is crosslinked to some degree, even if the polyisocyanate is not used in combination with the binder resin.

Preferably, a radiation-curable resin is used as a part or a whole of the thermosetting binder resin. As the radiation-curable resin, the above thermosetting resin which is acrylic modified to have a radiosensitive double bond, an acrylic monomer or an acrylic oligomer is used.

The average particle size of the magnetic powder in the magnetic layer is preferably from 5 nm to less than 25 nm, more preferably 10 to 20 nm. When this average particle size is less than 5 nm, the surface energy of the particles becomes larger, which makes it difficult to disperse the particles. When it is 25 nm or more, noises become larger.

As the magnetic powder, ferromagnetic iron-based metal magnetic powder, iron nitride magnetic powder and plate-shaped hexagonal Ba-ferrite magnetic powder are preferable.

Each of the ferromagnetic iron-based metal magnetic particles may contain a transition metal such as Mn, Zn, Ni, Cu, Co or the like as a component of an alloy. Among them, Co and Ni are preferred, and Co is particularly preferred since the use of Co is most effective to improve the saturation magnetization. The amount of the transition metal element is preferably 5 to 50 atomic %, more preferably 10 to 30 atomic % based on the amount of iron. Further, at least one rare earth element selected from the group consisting of yttrium, cerium, ytterbium, cesium, praseodymium, samarium, lanthanum, europium, neodymium, terbium and the like may be added to prevent the sintering of the magnetic particles. Preferably, cerium, neodymium, samarium, terbium or yttrium is used, since the use thereof is effective to obtain a higher coercive force. The amount of the rare earth element is 0.2 to 20 atomic %, preferably 0.3 to 15 atomic %, more preferably 0.5 to 10 atomic % based on the amount of iron.

The particles of the ferromagnetic iron-based metal magnetic powder are usually acicular, spindle-shaped or rice-grain-shaped, and preferably have an average particle size (longer axis length) of 10 nm to less than 25 nm. When the average particle size is less than 10 nm, the magnetic powder cannot have a coercive force in a preferred range, or a specific surface area increases so that the dispersion becomes unstable. Therefore, the desired recording-reproducing characteristics may not be attained. When the average particle size is 25 nm or more, the particle noise attributed to the particle size increases.

The ferromagnetic iron-based metal magnetic powder preferably has an axis ratio (a ratio of a longer axis length to a shorter axis length) of 1 to less than 2. When the axis ratio is in this range, the filling rate of the particles in the coated magnetic layer does not decrease when the layer is oriented in a magnetic field.

The known iron nitride magnetic powder may be used. The particle shape of the iron nitride magnetic powder may be acicular, spherical or cubic. Its average particle size is preferably 20 nm or less, and their axis ratio is preferably from 1 to less than 2, more preferably 1.5 or less (see WO 03/079333).

In particular, one preferable iron nitride magnetic powder comprises a core portion mainly comprising a nitride of iron and optionally other transition metal, in particular, a $Fe_{16}N_2$ phase, or a $Fe_{16}N_2$ phase in which a part of iron elements (e.g. 50 atomic % or less) are substituted with at least one other transition metal, and an outer layer which mainly contains at least one element the oxide of which is not reduced with hydrogen at a temperature of 600° C. or less (for example, a rare earth element, aluminum, silicon, zirconium, titanium, etc., in particular, a rare earth element, aluminum and silicon), since such magnetic powder easily has a coercive force of 200 kA/m or more.

The coercive forces of the ferromagnetic iron-based metal magnetic powder and the iron nitride magnetic powder are preferably 160 to 400 kA/m, more preferably 200 to 350 kA/m, and the saturation magnetization thereof is preferably 60 to 200 $Am^2/kg$ (60 to 200 emu/g), more preferably 80 to 180 $Am^2/kg$ (80 to 180 emu/g).

The BET specific surface area of the ferromagnetic powder is preferably 35 $m^2/g$ or more, more preferably 40 $m^2/g$ or more, most preferably 50 $m^2/g$ or more. It is preferably 100 $m^2/g$ or less.

The above ferromagnetic iron-based metal magnetic powder and the above iron nitride magnetic powder may be surface-treated with Al, Si, P, Y or Zr, or an oxide thereof.

The coercive force of the hexagonal Ba-ferrite magnetic particles is preferably 160 to 400 kA/m, more preferably 200 to 350 kA/m, and the saturation magnetization thereof is preferably 40 to 70 $Am^2/kg$ (40 to 70 emu/g).

The particle size (the dimension in the plate plane direction) of the hexagonal Ba-ferrite magnetic powder is preferably 10 to 25 nm, more preferably 10 to 20 nm. When the particle size is less than 10 nm, the surface energy of the particles increases, which makes it difficult to disperse the magnetic particles in a coating composition. When it exceeds 25 nm, the particle noises attributed to the size of the particles become larger. The plate ratio of the hexagonal Ba-ferrite magnetic powder (i.e., the plate size/thickness of the plate) is preferably 1 to less than 2, more preferably 1 to 1.5. The BET specific surface area of the hexagonal Ba-ferrite magnetic powder is preferably 1 to 100 $m^2/g$.

As the magnetic powder to be contained in the magnetic layer according to the present invention, the iron nitride magnetic powder and the hexagonal Ba-ferrite magnetic powder, which have a large coercive force, are preferable. The iron nitride magnetic powder, which also has a large saturation magnetization, is more preferable.

The above magnetic properties of the magnetic powder are measured with a vibrating sample magnetometer in an external magnetic field of 1,273.3 kA/m (16 kOe).

The average particle size of the magnetic powder is determined by photographing the particles with a transmission electron microscope (TEM), measuring the maximum particle size of each particle on the photograph (or the major axes of needle-shaped particles, or the plate sizes of plate-shaped particles), and averaging the maximum particle sizes of 100 particles to obtain a number average value.

In the magnetic recording medium of the present invention, the average particle size R of the substantially particulate non-magnetic powder having the largest average particle size among non-magnetic powders contained in the magnetic powder and the thickness D of the magnetic layer preferably satisfy the above relationship (1).

In such a case, the substantially particulate non-magnetic powder preferably has an average particle size of less than 200 nm, and an axis ratio of less than 3.

Examples of the non-magnetic powder which satisfies the relationship (1) include α-alumina, β-alumina, silicon carbide, chrome oxide, cerium oxide, α-iron oxide, corundum, artificial diamond, silicon nitride, silicon carbide, titanium carbide, titanium oxide, silicon dioxide, boron nitride and the like, which has a Moh's hardness of 6 or more. They may be used alone or in combination.

Any other known non-magnetic powders may be used as long as they can improve the durability of the magnetic recording medium. Examples of the other non-magnetic powders include carbon black, metal salt powders (e.g. calcium carbonate, barium sulfate, etc.), organic powders insoluble in organic solvents (e.g. benzoguanamine, crosslinked polystyrene, polyethylene, silicone resins, polytetrafluoroethylene, etc.), and so on.

The substantially particulate non-magnetic powder preferably has an average particle size of 9 to 250 nm, provided that it satisfies the above relationship (1) with regard to the magnetic layer having a thickness of 10 nm to less than 100 nm. Particularly when the MR head is used as a reproducing head, the substantially particulate non-magnetic powder preferably has an average particle size R of less than 200 nm, more preferably 180 nm or less. When the substantially particulate non-magnetic powder has the average particle size in the above range, the thermal noise of the magnetic recording medium can be further decreased.

When the R/D ratio of the magnetic recording medium of the present invention is larger than 1.5 (R/D>1.5), the center of gravity of the particle of the substantially particulate non-magnetic powder may not be present in the magnetic layer, but may be present in the primer layer. Such configuration of the particles may be allowed in the present invention.

The amount of the substantially particulate non-magnetic powder satisfying the above relationship (1) can be adequately selected according to the required durability of the magnetic recording medium, the abraded amount of the head, etc. In general, the amount of the substantially particulate non-magnetic powder is 2 to 20 wt. % based on the weight of the magnetic powder. Such an amount corresponds to 0.3 to 30 particles of the substantially particulate non-magnetic powder per 10 μm length of the cross section of the magnetic layer in the in-plane direction, when the cross section of the magnetic recording medium is observed with a scanning electron microscope.

To include the substantially particulate non-magnetic powder in the magnetic layer, the substantially particulate non-magnetic powder is usually added to the magnetic paint for forming the magnetic layer. Alternatively, when the thin magnetic layer having a thickness of less than 100 nm is applied on the primer layer by the wet-on-wet method, the substantially particulate non-magnetic powder is not added to the magnetic paint, but added to the primer paint for forming the primer layer and then a part of the substantially particulate non-magnetic powder particles in the primer layer intrude into the magnetic layer and act as if the non-magnetic powder particles were contained in the magnetic layer.

The magnetic layer may optionally contain conventional carbon black to improve the conductivity and the surface lubricity of the magnetic layer. Examples of carbon black include acetylene black, furnace black, thermal black or the like.

Preferably, carbon black has a (number) average particle size of 10 to 100 nm. When it is less than 10 nm, the dispersion of carbon black becomes difficult. When it exceeds 100 nm, a large amount of carbon black should be added. In either case, the surface of the magnetic layer becomes rough, which leads to the decrease of output. If needed, two or more kinds of carbon black with different (number) average particle sizes may be used. In the present invention, carbon black preferably has an average particle size R which satisfies the above relationship (1).

Lubricant

Preferably, each of the magnetic layer and the primer layer contains 0.5 to 3.0 wt. % of a fatty acid amide, or 0.5 to 5.0 wt. % of a higher fatty acid, or 0.2 to 3.0 wt. % of a higher fatty acid ester, based on the amount of the powders contained in each layer.

When the amount of the fatty acid amide added to the layer is less than 0.5 wt. %, the direct contact at the interface between the head and the non-magnetic layer tends to occur, and thus, a seizure-preventive effect is poor. When this amount exceeds 3.0 wt. %, the lubricant bleeds out from the layer, which may cause defects such as drop-out.

When the amount of the higher fatty acid added to the layer is less than 0.5 wt. %, the effect of decreasing the friction coefficient is poor. When it exceeds 5.0 wt. %, the primer layer is plasticized, and thus, the primer layer may lose toughness.

When the amount of the higher fatty acid ester added to the layer is less than 0.2 wt. %, the effect of decreasing the friction coefficient is poor. When it exceeds 3.0 wt. %, the lubricant excessively migrates to the magnetic layer, which may induce an adverse effect as the sticking of the tape to the head.

As the higher fatty acid, a fatty acid having 10 or more carbon atoms is preferably used. As the higher fatty acid ester, an ester of the above higher fatty acid is preferably used. The fatty acid having 10 or more carbon atoms may be in the form of a linear chain or a branched chain, or may be a cis- or trans-isomer. Preferably, a linear fatty acid with high lubricity is used. Examples of such a fatty acid include lauric acid, myristic acid, stearic acid, palmitic acid, behenic acid, oleic acid, linolic acid and the like. Among them, myristic acid, stearic acid and palmitic acid are preferred.

Herein, the mutual migration of the lubricant in the magnetic layer and one in the primer layer is not excluded. When the lubricant is contained in the primer layer, the magnetic layer may not contain any lubricant. When the addition of the lubricant to the magnetic layer can achieve the intended effects, it is not necessary for the primer layer to contain any lubricant.

To add the lubricant to the magnetic layer and/or the primer layer, the lubricant may be added to a coating paint for forming the respective layer. Alternatively, the magnetic layer or the primer layer is formed using no lubricant, and then the liquid lubricant or a solution containing the lubricant is coated on the respective layer by spraying, etc., or the respective layer is dipped therein.

Dispersant

The particles of the non-magnetic powders, carbon black and magnetic powder contained in the magnetic layer and/or the primer layer may be surface-treated with a conventional dispersant. Alternatively, a dispersant may be added to a paint for forming each of the above layers. The amount of the dispersant in each layer is usually from 0.5 to 20 parts by weight per 100 parts by weight of the binder.

As the dispersant, a fatty acid having 12 to 18 carbon atoms of the formula: RCOOH wherein R is an alkyl or alkenyl group having 11 to 17 carbon atoms can be used. Examples of such a fatty acid include caprylic acid, capric acid, lauric acid, myristic acid, palmitic acid, stearic acid, behenic acid, oleic acid, eladic acid, linoleic acid, linolenic acid and stearolic acid.

Apart from the fatty acid, the following compounds may be used as dispersants: metal soaps formed of salts of the above fatty acids with alkaline metals or alkaline earth metals; the amides of the above fatty acids; the esters of the above fatty acids, which may optionally contain one or more fluorine atoms; polyalkylene oxide alkylphosphate; lecithin; trialkylpolyolefinoxy quaternary ammonium salt in which the alkyl group has 1 to 5 carbon atoms, and olefin is ethylene, propylene or the like; sulfates; sulfonates; phosphates; and copper phthalocyanine and the like. These dispersants may be used alone or in combination.

Back Coat Layer

When the magnetic recording medium of the present invention is a magnetic tape, a back coat layer may be formed on the other surface of the non-magnetic substrate of the magnetic tape of the present invention, that is, the opposite surface to the surface of the substrate on which the primer layer and the magnetic layer are formed, so as to improve the running performance of the tape. Generally, the back coat layer comprises a non-magnetic powder, preferably carbon black, and a binder resin.

If the back coat layer is magnetic, magnetic signals recorded on the magnetic layer tend to be disturbed. Therefore, generally, the back coat layer is non-magnetic.

The thickness of the back coat layer is preferably from 0.2 to 0.8 μm. When it is less than 0.2 μm, the running performance-improving effect is insufficient. When it exceeds 0.8 μm, the thickness of a whole of the tape becomes larger, resulting in a less memory capacity per one reel of the tape.

The center line average height Ra of the back coat layer is preferably 3 to 8 nm, more preferably 4 to 7 nm.

Examples of carbon black contained in the back coat layer include acetylene black, furnace black, thermal black or the like. Usually, carbon black with a smaller particle size is used in combination with carbon black with a larger particle size.

The total amount of the small particle size carbon black and the large particle size carbon black to be added is preferably 60 to 98 wt. %, more preferably 70 to 95 wt. % based on the weight of the inorganic particles.

The number-average particle size of carbon black with a smaller particle size is preferably 5 to 200 nm, more preferably 10 to 100 nm. When it is less than 5 nm, the dispersion of carbon black becomes difficult. When it exceeds 200 nm, a large amount of carbon black is needed. In either case, the surface of the back coat layer becomes rough, and such roughness of the back coat layer is embossed onto the magnetic layer. The use of large particle size carbon black with a number-average particle size of 200 to 400 nm in an amount of 5 to 15 wt. % based on the amount of small particle size carbon black is advantageous, because the surface of the back coat layer is not roughened, and the tape-running performance-improving effect is enhanced.

The back coat layer may contain non-magnetic plate-shaped particles with a number-average particle size of 10 to 100 nm in order to improve the strength and dimensional stability thereof against changes in temperature and humidity. As the component of the non-magnetic plate-shaped particles, not only aluminum oxide but also an oxide or compound oxide of a rare earth element such as cerium or zirconium, silicon, titanium, manganese, iron or the like may be used. To improve the electric conductivity of the back coat layer, plate-shaped carbonaceous particles with an average particle size of 10 to 100 nm or plate-shaped ITO particles with an average particle size of 10 to 100 nm may be added. If necessary, granular iron oxide particles with an average particle size of 0.1 to 0.6 μm may be further added.

The amount of the non-magnetic particles to be added is preferably 2 to 40 wt. %, more preferably 5 to 30 wt. % based on the weight of a whole of the inorganic particles contained in the back coat layer. The addition of alumina particles with an average particle size of 0.1 to 0.6 μm is preferred, since the durability of the back coat layer is enhanced.

The binder resin to be contained in the back coat layer may be the same one as the resins used in the magnetic layer and the primer layer. To reduce the friction coefficient and to improve the tape-running performance, a cellulose resin is preferably used in combination with a polyurethane resin as the binder resin. The content of the binder resin is generally 40 to 150 parts by weight, preferably 50 to 120 parts by weight, more preferably 60 to 110 parts by weight, still more preferably 70 to 110 parts by weight per total 100 parts by weight of the above carbon black particles and the above inorganic non-magnetic particles. When the content of the binder resin is less than 50 parts by weight, the strength of the back coat layer is insufficient. When it exceeds 120 parts by weight, the friction coefficient tends to increase. The use of 30 to 70 parts by weight of a cellulose resin in combination with 20 to 50 parts by weight of a polyurethane resin as the binder resin is preferable.

More preferably, a cross-linking agent such as a polyisocyanate compound or the like is used to cure the binder resin.

The amount of the cross-linking agent is generally 10 to 50 parts by weight, preferably 10 to 35 parts by weight, more preferably 10 to 30 parts by weight per 100 parts by weight of the binder resin. When this amount is less than 10 parts by weight, the strength of the back coat layer tends to be weak. When it exceeds 35 parts by weight, the dynamic friction coefficient of the back coat layer against guide rollers, which are usually made of SUS 304 stainless steel and installed in a running system of a tape drive, becomes larger. Here, the same radiation-curable resins as those used in the magnetic layer and the primer layer may be used as a crosslinking agent.

When the thickness of the primer layer is 0.5 μm or less, the amount of the lubricant supplied from the primer layer to the surface of the magnetic layer may get low. In such a case, a lubricant is preferably supplied from the back coat layer to the surface of the magnetic layer. As the lubricant, the same type of the lubricant as used in the magnetic layer and the primer layer may be used. Preferably, 0.5 to 3.0 wt. % of a fatty acid amide, 0.2 to 3.0 wt. % of a higher fatty acid ester and 0.5 to 5.0 wt. % of a higher fatty acid are added as the lubricant, based on the weight of a whole of the non-magnetic particles in the back coat layer.

Organic Solvent

Examples of organic solvents to be used in the preparation of the coating compositions for the magnetic layer, the primer layer and the back coat layer include ketones such as methyl ethyl ketone, cyclohexanone and methyl isobutyl ketone; ethers such as tetrahydrofuran and dioxane; and acetates such as ethyl acetate and butyl acetate. Each of these solvents may be used alone or in combination, or may be further mixed with toluene or the like for use.

EXAMPLES

Hereinafter, the present invention will be described in more detail by way of Examples thereof, which are not limit the scope of the present invention in any way. Throughout Examples and Comparative Examples, the parts indicate parts by weight, and the average particle sizes indicate number average particle sizes, unless otherwise specified.

Example 1

Components of Coating Composition for Primer Layer

| (1) | |
|---|---|
| Non-magnetic plate-shaped iron oxide powder with an average particle size of 50 nm | 76 parts |
| Carbon black with an average particle size of 25 nm | 24 parts |
| Stearic acid | 2.0 parts |
| Vinyl chloride-hydroxypropyl acrylate copolymer containing —SO$_3$Na groups (0.7 × 10$^{-4}$ eq./g) | 8.8 parts |
| Polyesterpolyurethane resin containing —SO$_3$Na groups (1 × 10$^{-4}$ eq./g) and having a Tg of 40° C. | 4.4 parts |
| Cyclohexanone | 25 parts |
| Methyl ethyl ketone | 40 parts |
| Toluene | 10 parts |
| (2) | |
| Stearic acid | 1 part |
| Butyl stearate | 1 part |
| Cyclohexanone | 70 parts |
| Methyl ethyl ketone | 50 parts |
| Toluene | 20 parts |
| (3) | |
| Polyisocyanate | 1.4 parts |
| Cyclohexanone | 10 parts |
| Methyl ethyl ketone | 15 parts |
| Toluene | 10 parts |

Components of Coating Composition for Magnetic Layer

| (1) Kneading step | |
|---|---|
| Magnetic powder (Y—Fe—N) (Y/Fe = 5.5 atomic %, N/Fe = 11.9 atomic %, σs: 103 Am$^2$/kg (103 emu/g), Hc: 210.9 kA/m (2,650 Oe), av. particle size: 17 nm, and axis ratio: 1.1) | 100 parts |
| Vinyl chloride-hydroxypropyl acrylate copolymer containing —SO$_3$Na groups (0.7 × 10$^{-4}$ eq./g) | 13 parts |
| Polyester-polyurethane resin (PU) containing —SO$_3$Na groups (1.0 × 10$^{-4}$ eq./g) | 4.5 parts |
| Particulate alumina powder (av. particle size: 80 nm, and axis ratio: 1.2) | 10 parts |
| Methyl acid phosphate (MAP) | 2 parts |
| Tetrahydrofuran (THF) | 20 parts |
| Methyl ethyl ketone/cyclohexanone (MEK/A) | 9 parts |
| (2) Diluting step | |
| Palmitylamide (PA) | 1.5 parts |
| n-Butyl stearate (SB) | 1 part |
| Methyl ethyl ketone/cyclohexanone (MEK/A) | 350 parts |
| (3) Blending step | |
| Polyisocyanate | 1.5 parts |
| Methyl ethyl ketone/cyclohexanone (MEK/A) | 29 parts |

The components (1) of the coating composition for a primer layer were kneaded with a batch-wise kneader, and the components (2) were added. The mixture was stirred and dispersed with a sand mill for residence time of 60 minutes. To the resultant dispersion, were added the components (3), and the mixture was stirred and filtered to obtain the coating composition for the primer layer.

Separately, the components (1) of the magnetic layer for the kneading step were previously mixed at a high speed, and the mixed particles were kneaded with a continuous twin-screw kneader, and the components (2) for the diluting step were added to the knead-mixture so as to dilute the mixture in at least two stages with the continuous twin-screw kneader. The diluted mixture was dispersed with a sand mill for residence time of 45 minutes, and the components (3) for the blending step were added. The mixture was then stirred and filtered to obtain the coating composition for the magnetic layer.

The above coating composition for the primer layer was applied to a non-magnetic substrate composed of an aromatic polyamide film with a thickness of 3.9 μm (MICTRON manufactured by Toray Industries, Inc.; MD=11 GPa, and MD/TD=0.7), so that the resultant layer could have a thickness of 0.9 μm after being dried and calendered. Thus, the primer layer was formed on the non-magnetic substrate. The coating composition for the magnetic layer was applied to the primer layer with an extrusion coater by the wet-on-wet method, so that the resultant layer could have a thickness of 60 nm after being oriented in a magnetic field, dried and calendered, and then the coated layer was oriented in a magnetic field and dried with a drier and far-infrared ray. Thus, the magnetic layer was formed.

Components of Coating Composition for Back Coat Layer

| Carbon black (with an average particle size of 25 nm) | 80 parts |
|---|---|
| Carbon black (with an average particle size of 350 nm) | 10 parts |
| Non-magnetic plate-shaped iron oxide particles (with an average particle size of 50 nm) | 10 parts |
| Nitrocellulose | 45 parts |
| Polyurethane resin (containing —SO$_3$Na groups) | 30 parts |
| Cyclohexanone | 260 parts |
| Toluene | 260 parts |
| Methyl ethyl ketone | 525 parts |

The above components of the coating composition for the back coat layer were dispersed with a sand mill for residence time of 45 minutes, and polyisocyanate (15 parts) was added to the dispersion to prepare the coating composition for the back coat layer. The coating composition was filtered, and was then applied to the other surface of the non-magnetic substrate having no magnetic layer formed thereon, so that the resultant layer could have a thickness of 0.5 μm after dried and calendered. Then, the applied layer was dried.

The magnetic sheet thus obtained was planished with a seven-stage calender comprising metal rolls, at a temperature of 100° C. under a linear pressure of 196 kN/m, and was wound onto a core. The wound magnetic sheet was aged at 70° C. for 72 hours to obtain a magnetic sheet having a back coat layer.

Then, the magnetic sheeat was cut into tapes with widths of ½ inch using a slitting machine.

The slitting machine (for cutting the magnetic sheet into magnetic tapes with given widths) adapted as follows was used. A tension cut roller was provided in the route for the web, extending between the sheet-unwinding position and a set of slitting blades. The tension cut roller was of mesh suction type which had sucking portions having porous metal embedded therein, and was directly connected to a motor without any mechanism for transmitting power to a blade-driving unit.

Example 2

A computer tape of Example 2 was produced in the same manner as in Example 1, except that the thickness of the magnetic layer was changed from 60 nm to 90 nm.

Example 3

A computer tape of Example 3 was produced in the same manner as in Example 2, except that the particulate alumina powder in the magnetic coating composition was changed to a particulate alumina powder having an average particle size of 150 nm and an axis ratio of 1.5, and that the thickness of the magnetic layer was changed from 60 nm to 65 nm.

Example 4

A computer tape of Example 4 was produced in the same manner as in Example 1, except that the following magnetic powder was used:

Magnetic powder (Y—N—Fe)
Y/Fe=5.3 atomic %, N/Fe=12.2 atomic %,
σs: 110 Am$^2$/kg (110 emu/g),
Hc: 214.9 kA/m (2,700 Oe),
av. particle size: 20 nm, and axis ratio: 1.1.

Example 5

A computer tape of Example 5 was produced in the same manner as in Example 1, except that the particulate alumina powder in the magnetic coating composition was changed to a particulate alumina powder having an average particle size of 230 nm and an axis ratio of 2.2, and that the thickness of the magnetic layer was changed from 60 nm to 95 nm.

Example 6

A computer tape of Example 6 was produced in the same manner as in Example 1, except that the particulate alumina powder in the magnetic coating composition was changed to a particulate alumina powder having an average particle size of 200 nm and an axis ratio of 2.1, and that the thickness of the magnetic layer was changed from 60 nm to 80 nm.

Comparative Example 1

A computer tape of Comparative Example 1 was produced in the same manner as in Example 1, except that the thickness of the magnetic layer was changed from 60 nm to 95 nm.

Comparative Example 2

A computer tape of Comparative Example 2 was produced in the same manner as in Example 1, except that the particulate alumina powder in the magnetic coating composition was changed to a particulate alumina powder having an average particle size of 50 nm and an axis ratio of 1.2.

Comparative Example 3

A computer tape of Comparative Example 3 was produced in the same manner as in Example 1, except that the particulate alumina powder in the magnetic coating composition was changed to a particulate alumina powder having an average particle size of 150 nm and an axis ratio of 1.5, and that the thickness of the magnetic layer was changed from 60 nm to 55 nm.

Comparative Example 4

A computer tape of Comparative Example 4 was produced in the same manner as in Example 2, except that the following magnetic powder was used:
Plate-shaped magnetic powder (Ba—Fe)
σs: 50 Am$^2$/kg (50 emu/g),
Hc: 165.1 kA/m (2,075 Oe),
av. particle size: 24 nm, and axis ratio: 3.2.

Comparative Example 5

A computer tape of Comparative Example 5 was produced in the same manner as in Comparative Example 4, except that the following magnetic powder was used:
Acicular magnetic powder (Al—Y—Co—Fe)
σs: 86 Am$^2$/kg (86 emu/g),
Hc: 107.4 kA/m (1,350 Oe),
av. particle size: 30 nm, and axis ratio: 3.0.

Comparative Example 6

A computer tape of Comparative Example 6 was produced in the same manner as in Comparative Example 4, except that the following magnetic powder was used:
Particulate magnetic powder (Y—N—Fe)
Y/Fe=5.0 atomic %, N/Fe=10.4 atomic %,
σs: 105 Am$^2$/kg (105 emu/g),
Hc: 209.3 kA/m (2,630 Oe),
av. particle size: 25 nm, and axis ratio: 1.1,
and that the particulate alumina powder in the magnetic coating composition was changed to a particulate alumina powder having an average particle size of 150 nm and an axis ratio of 1.5.

With the computer tapes produced in Examples 1-6 and Comparative Examples 1-6, C/N and still durability were evaluated by the following methods. The results are shown in Tables 1 and 2. For easy reference, these tables also include the thickness of the magnetic layer, and the particle size and the number of the substantially particulate non-magnetic powder used, which were measured by the methods described below Measurement of C/N A drum tester was used to measure the electromagnetic converting performance of a magnetic tape. An electromagnetic induction type head (track width: 25 μm, and gap: 0.2 μm) and a MR head (track width: 8 μm) were mounted on the drum tester so as to record data with the electromagnetic induction type head and reproduce the recorded data with the MR head. The electromagnetic induction type head and the MR head were disposed at different positions on the rotary drum, and both the heads are moved up and down to keep pace with each other in tracking. A proper length of the magnetic tape was drawn and cut from the wound magnetic tape assembled in the cartridge and scraped. Further 60 cm of the magnetic tape was cut therefrom and was further shaped into a tape strip with a width of 4 mm, which was then wound around the outer curved surface of the rotary drum.

An output and noises were evaluated as follows. A rectangular waveform signal was inputted to a recording current generator with a function generator. A signal with a wavelength of 0.2 μm was written on the magnetic tape and reproduced with the MR head. An output from the MR head was amplified with a preamplifier, and was read into a spectrum analyzer. The carrier value of 0.2 μm was defined as an output C from the medium. When a signal with a rectangular waveform of a wavelength of 0.2 μm is written, a difference obtained by subtracting an output and a system noise from the spectral component equivalent to the recording wavelength of 0.2 μm was integrated, and the resultant integrated value was used as a noise value N. The output C from the medium and the ratio C/N were compared with the values obtained from the computer tape of Comparative Example 4 to determine the relative values.

Measurement of Still Durability

The still durability of the magnetic tape was evaluated using the drum tester, as well. The magnetic tape was set on the drum, and a carrier signal with a wavelength of 0.9 μm was similarly written on the tape. Both the heads were kept contacting the tape to continue the measurement of the output therefrom. After that, a period of time during which the output value decreased to 80% of the initial output value was defined as the still life.

Measurement of Magnetic Layer Thickness

A magnetic tape was buried in a resin, and the cross section of the resin was cut out in a thickness direction using a focused ion beam processing system. The cross section was photographed by a scanning electron microscope at a magnification of 100,000 times in ten fields of view. Then, the surface of the magnetic layer and the boundary line between the magnetic layer and the primer layer were contoured. From each field of view of the photograph, five points at which no non-magnetic powder particle present on the interfacial line were selected (in total, 50 points), and the distance between the two contours at each point was measured as the thickness of the magnetic layer, and then the fifty measured values were averaged to obtain the thickness of the magnetic layer.

Particle Size And Number of Particles of Substantially Particulate Non-Magnetic Powder In the same manner as in the measurement of the thickness of the magnetic layer, the necessary number of photographs of the cross section of the magnetic layer were taken with a scanning electron microscope at a magnification of 100,000 in a continuous filed of view. Then, the outline of each of the particles which are completely buried in the magnetic layer or to the depth of at least two thirds of the thickness of the magnetic layer from the primary layer was contoured. The maximum span of such a particle was measured as a particle size. With 50 particles, the particle sizes were measured and averaged to obtain an average particle size. From the length of the cross section from which 50 particles were obtained, the number of the particles in the 10 μm length of the cross section were obtained.

TABLE 1

| | Example No. | | | | | |
|---|---|---|---|---|---|---|
| | 1 | 2 | 3 | 4 | 5 | 6 |
| Magnetic powder | | | | | | |
| Shape | Particulate | Particulate | Particulate | Particulate | Particulate | Particulate |
| Av. particle size (nm) | 17 | 17 | 17 | 20 | 17 | 17 |
| Axis ratio | 1.1 | 1.1 | 1.1 | 1.1 | 1.1 | 1.1 |
| Non-magnetic powder | | | | | | |
| Av. particle size R (nm) | 80 | 80 | 150 | 80 | 230 | 200 |
| Acicular ratio | 1.2 | 1.2 | 1.5 | 1.2 | 2.2 | 2.1 |
| Thickness D of magnetic layer (nm) | 60 | 90 | 65 | 90 | 95 | 80 |
| R/D | 1.3 | 0.89 | 2.3 | 0.89 | 2.4 | 2.5 |
| No. of non-magnetic powder particles | 9 | 15 | 2.8 | 13 | 1.6 | 1.9 |
| Characteristics | | | | | | |
| C/N (dB) | 2.4 | 2.2 | 1.6 | 1.2 | 1.2 | 1.5 |
| Still life (min.) | 17 | 11 | 25 | 16 | 26 | 24 |

TABLE 2

| | Comparative Example No. | | | | | |
|---|---|---|---|---|---|---|
| | 1 | 2 | 3 | 4 | 5 | 6 |
| Magnetic powder | | | | | | |
| Shape | Particulate | Particulate | Particulate | Plate | Acicular | Particulate |
| Av. particle size (nm) | 17 | 17 | 17 | 24 | 30 | 25 |
| Axis ratio | 1.1 | 1.1 | 1.1 | 3.2 | 3.0 | 1.1 |
| Non-magnetic powder | | | | | | |
| Av. particle size R (nm) | 80 | 50 | 150 | 80 | 80 | 150 |
| Acicular ratio | 1.2 | 1.2 | 1.5 | 1.2 | 1.2 | 1.5 |
| Thickness D of magnetic layer (nm) | 95 | 60 | 55 | 90 | 90 | 90 |
| R/D | 0.84 | 0.83 | 2.7 | 0.89 | 0.89 | 1.7 |
| No. of non-magnetic powder particles | 15 | 22 | 2.3 | 2.1 | 2.2 | 1.5 |
| Characteristics | | | | | | |
| C/N (dB) | 2.0 | 2.1 | 0.6 | 0 | 1.8 | 0.1 |
| Still life (min.) | 8 | 6 | 27 | 9 | 9 | 20 |

As can be seen from the data in Tables 1 and 2, the computer tapes of Examples 1 to 6 according to the present invention had better C/N and higher still durability than those of Comparative Examples 1 to 6, since the former computer tapes satisfied the properties of the present invention such as the shape and particle size of the magnetic powder particles, and the thickness of the magnetic layer and also the R/D ratio.

Hereinafter, with reference to FIGS. 1 to 3, the critical significances of the resultant values of the present invention are elucidated.

FIG. 1 shows the relationship between the R and D values and the C/N value of the magnetic tapes. Using the structure of the magnetic tape of Example 1 as the basic structure, the average particle size of the substantially particulate non-magnetic powder was changed in a range between 80 nm and 230 nm, and the thickness of the magnetic tape was changed in a range between 35 nm and 100 nm. The C/N values of the produced computer tapes are also indicated near the respective points. As can be seen from FIG. 1, the C/N values decreased in the region above the broken line corresponding to R/D=2.5.

Figure 2:
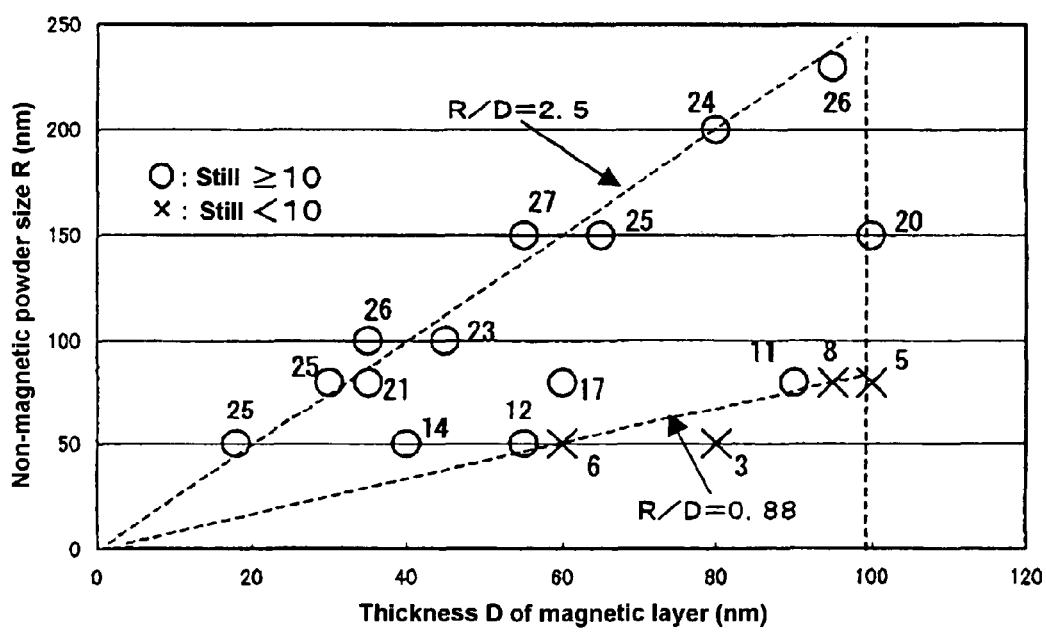
FIG. 2 shows the relationship between R and D values and still durability of the computer tapes produced in Examples and Comparative Examples.

FIG. 2 shows the relationship between the R and D values and the still durability. Using the structure of the magnetic tape of Example 1 as the basic structure, the average particle size of the substantially particulate non-magnetic powder was changed in a range between 80 nm and 230 nm, and the thickness of the magnetic tape was changed in a range between 35 nm and 100 nm. The still lives (minutes) of the produced computer tapes are also indicated near the respective points. As can be seen from FIG. 2, the still durability (or still life) decreased in the region below the broken line corresponding to R/D=0.88.

Figure 3:
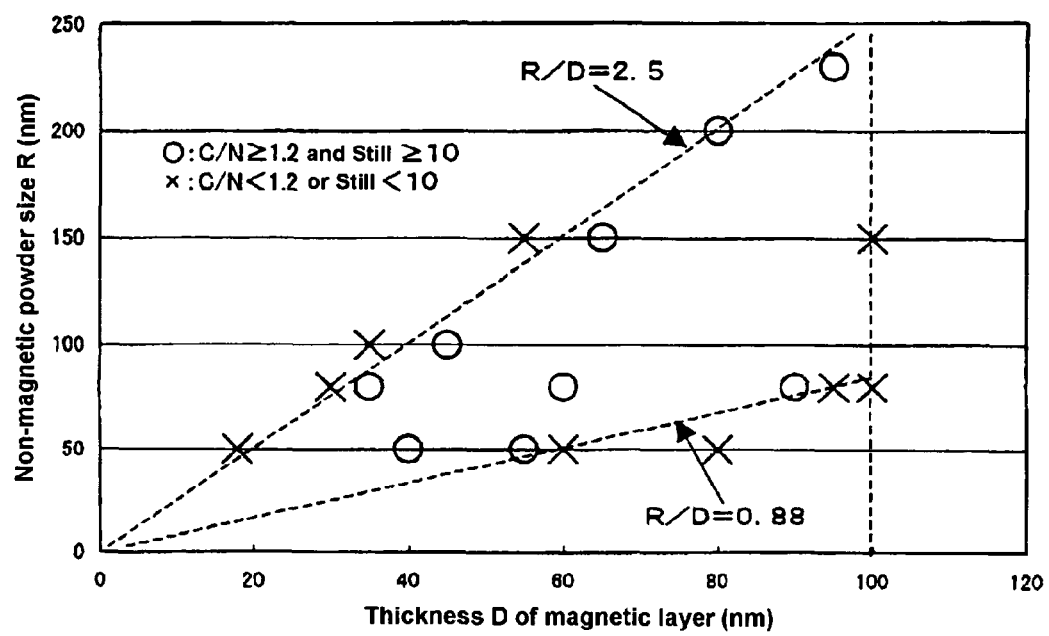
FIG. 3 shows the results of FIGS. 2 and 3 in one graph.

FIG. 3 shows the results of FIGS. 2 and 3 in one graph. FIG. 3 indicates that the C/N value and the still durability are both good in the region between two broken lines in which the R and D values satisfy the relationship (1), i.e. $0.88 \leq R/D \leq 2.5$.

What is claimed is:

1. A magnetic recording medium, comprising:
    a non-magnetic substrate,
    a non-magnetic layer containing a non-magnetic powder and a binder formed on the non-magnetic substrate, and
    a magnetic layer having a thickness of less than 100 nm and containing a substantially particulate non-magnetic powder, a substantially particulate magnetic powder having an acicular ratio of less than 2 and an average particle size of less than 25 nm, and a binder,
    wherein an average particle size R of the non-magnetic powder contained in the magnetic layer and a thickness D of the magnetic layer satisfy the following relationship:
    $$0.885 \leq R/D \leq 2.5.$$

2. The magnetic recording medium according to claim 1, wherein the non-magnetic powder contained in the magnetic layer has an average particle size of less than 200 nm.

3. The magnetic recording medium according to claim 1, wherein the non-magnetic powder contained in the magnetic layer has a Moh's hardness of at least 6.

4. The magnetic recording medium according to claim 1, wherein the non-magnetic powder contained in the magnetic layer is at least one non-magnetic powder selected from the group of α-alumina, β-alumina, silicon carbide, chromium oxide, cerium oxide, α-iron oxide, corundum, artificial diamond, silicon nitride, silicon carbide, titanium carbide, titanium oxide, silicon dioxide and boron nitride.

5. The magnetic recording medium according to claim 1, wherein the magnetic layer further comprises carbon black.

6. The magnetic recording medium according to claim 1, wherein an axis ratio of a longer axis to a shorter axis of a single particle of said non-magnetic powder is less than 3.

* * * * *